United States Patent
Jia et al.

(10) Patent No.: US 10,514,259 B2
(45) Date of Patent: Dec. 24, 2019

(54) QUAD PROOF MASS MEMS GYROSCOPE WITH OUTER COUPLERS AND RELATED METHODS

(71) Applicant: Analog Devices, Inc., Norwood, MA (US)

(72) Inventors: Kemiao Jia, Tolland, CT (US); Xin Zhang, Acton, MA (US); Jianglong Zhang, Vienna, VA (US); Jinbo Kuang, Acton, MA (US)

(73) Assignee: Analog Devices, Inc., Norwood, MA (US)

( * ) Notice: Subject to any disclaimer, the term of this patent is extended or adjusted under 35 U.S.C. 154(b) by 121 days.

(21) Appl. No.: 15/253,792

(22) Filed: Aug. 31, 2016

(65) Prior Publication Data

US 2018/0058853 A1    Mar. 1, 2018

(51) Int. Cl.
*G01C 19/5705*    (2012.01)
*G01C 19/5712*    (2012.01)

(52) U.S. Cl.
CPC ..... *G01C 19/5712* (2013.01); *G01C 19/5705* (2013.01)

(58) Field of Classification Search
None
See application file for complete search history.

(56) References Cited

U.S. PATENT DOCUMENTS

| | | |
|---|---|---|
| 5,241,861 A | 9/1993 | Hulsing, II |
| 5,392,650 A | 2/1995 | O'Brien et al. |
| 5,600,064 A | 2/1997 | Ward |
| 5,635,638 A | 6/1997 | Geen |
| 5,869,760 A * | 2/1999 | Geen ........... G01C 19/5712 73/504.04 |

(Continued)

FOREIGN PATENT DOCUMENTS

JP    2011145129 A    7/2011

OTHER PUBLICATIONS

Prikhodko et al., Foucault Pendulum on a Chip: Angle Measuring Silicon Mems Gyroscope. 2011 IEEE 24th International Conference on Micro Electro Mechanical Systems (MEMS 2011), Cancun, Mexico. Jan. 23-27, 2011;161-4.

(Continued)

*Primary Examiner* — Judy Nguyen
*Assistant Examiner* — Ruben C Parco, Jr.
(74) *Attorney, Agent, or Firm* — Wolf, Greenfield & Sacks, P.C.

(57) ABSTRACT

A two-axis microelectromechanical systems (MEMS) gyroscope having four proof masses disposed in respective quadrants of a plane is described. The quad proof mass gyroscope may comprise an inner coupler passing between a first and a third proof mass and between a second and a fourth proof mass, and coupling the four proof masses with one another. The quad proof mass gyroscope may further comprising a first outer coupler coupling the first and the second proof masses and a second outer coupler coupling the third and the fourth proof masses. The outer couplers may have masses configured to balance the center of masses of the four proof masses, and may have elastic constants matching the elastic constant of the inner coupler. The quad gyroscope may further comprise a plurality of sense capacitors configured to sense angular rates.

19 Claims, 8 Drawing Sheets

(56) References Cited

U.S. PATENT DOCUMENTS

| | | |
|---|---|---|
| 6,230,563 B1 | 5/2001 | Clark et al. |
| 6,257,059 B1 | 7/2001 | Weinberg et al. |
| 6,370,937 B2 | 4/2002 | Hsu |
| 6,505,511 B1 | 1/2003 | Geen et al. |
| 6,571,630 B1 | 6/2003 | Weinberg et al. |
| 6,705,164 B2 | 3/2004 | Willig et al. |
| 6,752,017 B2 | 6/2004 | Willig et al. |
| 6,845,668 B2 | 1/2005 | Kim et al. |
| 6,860,151 B2 | 3/2005 | Platt et al. |
| 6,877,374 B2 | 4/2005 | Geen |
| 6,883,361 B2 | 4/2005 | Wyse |
| 7,032,451 B2 | 4/2006 | Geen |
| 7,036,373 B2 | 5/2006 | Johnson et al. |
| 7,204,144 B2 | 4/2007 | Geen |
| 7,222,533 B2 | 5/2007 | Mao et al. |
| 7,227,432 B2 | 6/2007 | Lutz et al. |
| 7,284,429 B2 | 10/2007 | Chaumet et al. |
| 7,287,428 B2 | 10/2007 | Green |
| 7,313,958 B2 | 1/2008 | Willig et al. |
| 7,347,094 B2 | 3/2008 | Geen et al. |
| 7,421,897 B2 | 9/2008 | Geen et al. |
| 7,675,217 B2 | 3/2010 | Delevoye et al. |
| 8,096,181 B2 | 1/2012 | Fukomoto |
| 8,266,961 B2 | 9/2012 | Kuang et al. |
| 8,322,213 B2 | 12/2012 | Trusov et al. |
| 8,342,023 B2 | 1/2013 | Geiger |
| 8,354,900 B2 | 1/2013 | Cazzaniga et al. |
| 8,453,504 B1 | 6/2013 | Mao |
| 8,490,483 B2 | 7/2013 | Wrede et al. |
| 8,539,832 B2 | 9/2013 | Potasek et al. |
| 8,656,776 B2 | 2/2014 | Trusov et al. |
| 8,783,105 B2 | 7/2014 | Kuhlmann et al. |
| 8,794,067 B2 | 8/2014 | Schmid et al. |
| 8,844,357 B2 | 9/2014 | Scheben et al. |
| 8,991,247 B2 | 3/2015 | Trusov et al. |
| 9,212,908 B2 | 12/2015 | Geen et al. |
| 9,217,756 B2 | 12/2015 | Simon et al. |
| 9,493,340 B2 | 11/2016 | Mahameed et al. |
| 2006/0213265 A1 | 9/2006 | Weber et al. |
| 2007/0062282 A1 | 3/2007 | Akashi et al. |
| 2008/0282833 A1 | 11/2008 | Chaumet |
| 2009/0223277 A1 | 9/2009 | Rudolf et al. |
| 2012/0060604 A1 | 3/2012 | Neul et al. |
| 2012/0210788 A1* | 8/2012 | Gunther ............... G01C 19/574 73/504.12 |
| 2013/0192363 A1* | 8/2013 | Loreck ................ G01C 19/574 73/504.12 |
| 2013/0269413 A1 | 10/2013 | Tao et al. |
| 2014/0190258 A1 | 7/2014 | Donadel et al. |
| 2014/0260608 A1* | 9/2014 | Lin .................... G01C 19/5747 73/504.12 |
| 2015/0285633 A1 | 10/2015 | Kamal Said Abdel Aziz et al. |
| 2015/0330783 A1 | 11/2015 | Rocchi et al. |
| 2016/0025493 A1 | 1/2016 | Stewart |
| 2016/0264404 A1 | 9/2016 | Acar |
| 2016/0316146 A1* | 10/2016 | Kajimura ........... H04N 5/23287 |
| 2016/0349056 A1 | 12/2016 | Thompson et al. |
| 2018/0172445 A1 | 6/2018 | Prikhodko et al. |
| 2018/0172446 A1 | 6/2018 | Prikhodko et al. |
| 2018/0172447 A1 | 6/2018 | Prikhodko et al. |

OTHER PUBLICATIONS

Trusov et al., Flat Is Not Dead: Current and Future Performance of Si-MEMS Quad Mass Gyro (QMG) System. 2014 IEEE/ION Position, Location and Navigation Symposium. (PLANS 2014). May 5-8, 2014. 7 pages.

Trusov et al., Force Rebalance, Whole Angle, and Self-Calibration Mechanization of Silicon MEMS Quad Mass Gyro. IEEE 2014 International Symposium on Inertial Sensors and Systems (ISISS). Feb. 25-26, 2014;149-50.

U.S. Appl. No. 15/383,318, filed Dec. 19, 2016, Prikhodko et al.

U.S. Appl. No. 15/838,366, filed Dec. 19, 2016, Prikhodko et al.

U.S. Appl. No. 15/383,519, filed Dec. 19, 2016, Prikhodko et al.

Kumar et al., Amplitude modulated Lorentz force MEMS magnetometer with picotesla sensitivity. Journal of Micromechanics and Microengineering. Sep. 20, 2016; 26(10): http://iopscience.iop.org/article/10.1088/0960-1317/26/10/105021/meta#fnref-jmmaa3949bib003.

Li et al., Three-Axis Lorentz-Force Magnetic Sensor for Electronic Compass Applications. Journal of Microelectromechanical Systems. Aug. 2012;21(4):1002 http://ieeexplore.ieee.org/stamp/stamp.jsp?arnumber=6198750.

Park et al., Dynamics and control of a MEMS angle measuring gyroscope. Sensors and Actuators A: Physical 144.1 (2008): 56-63.

Zaman et al., A mode-matched silicon-yaw tuning-fork gyroscope with subdegree-per-hour Allan deviation bias instability. Journal of Microelectromechanical Systems 17.6 (2008): 1526-36.

Kranz et al., Micromechanical vibratory rate gyroscopes fabricated in conventional CMOS. Proc. Symposium Gyro Technology. Deutsche Gesellschaft Fuer Ortung Und Navigation, 1997. Stuttgart ,Germany. Sep. 16-17; pp. 3.0-3.8.

Kranz, Design, Simulation and Implementation of Two Novel Micromechanical Vibratory-Rate Gyroscopes. Department of Electrical and Computer Engineering. Carnegie Mellon University. May, 1988. 41 pages.

* cited by examiner

QUAD PROOF MASS MEMS GYROSCOPE WITH OUTER COUPLERS AND RELATED METHODS

FIELD OF THE DISCLOSURE

The present application relates to two-axis microelectromechanical systems (MEMS) gyroscopes.

BACKGROUND

Some two-axis MEMS gyroscopes include one or more proof masses for detecting angular rates about a first axis, and one or more proof masses for detecting angular rates about a second axis. Such MEMS gyroscopes are configured to detect angular rates by sensing Coriolis accelerations. Some two-axis gyroscopes include four proof masses disposed in respective quadrants of a plane.

SUMMARY OF THE DISCLOSURE

A two-axis microelectromechanical systems (MEMS) gyroscope having four proof masses disposed in respective quadrants of a plane is described. The quad proof mass gyroscope may comprise an inner coupler passing between a first and a third proof mass and between a second and a fourth proof mass, and coupling the four proof masses with one another. The quad proof mass gyroscope may further comprising a first outer coupler coupling the first and the second proof masses and a second outer coupler coupling the third and the fourth proof masses. The outer couplers may have masses configured to balance the center of masses of the four proof masses, and may have elastic constants matching the elastic constant of the inner coupler. The quad gyroscope may further comprise a plurality of sense capacitors configured to sense angular rates.

According to one aspect of the present application, a microelectromechanical systems (MEMS) gyroscope is provided. The MEMS gyroscope may comprise four proof masses disposed in respective quadrants of a plane and each configured to resonate, the first proof mass and the second proof mass being configured to resonate in-phase. The MEMS gyroscope may further comprise a first outer coupler coupling the first and second proof masses of the four proof masses; a second outer coupler coupling third and fourth proof masses of the four proof masses; and an inner coupler passing between the first and third proof masses and between the second and fourth proof masses and coupling the four proof masses with one another.

According to another aspect of the present application, a system is provided. The system may comprise four proof masses disposed in respective quadrants of a plane and each configured to rotate within the plane, the first proof mass and the second proof mass being configured to resonate in-phase; a first outer coupler coupling the first and second proof masses of the four proof masses; a second outer coupler coupling third and fourth proof masses of the four proof masses; an inner coupler passing between the first and third proof masses and between the second and fourth proof masses and coupling the four proof masses with one another; a sense electrode disposed on a substrate of the MEMS gyroscope and forming a sense capacitor with a portion of the first proof mass; and sense circuitry coupled to the sense capacitor and configured to digitize angular rate data for at least one of the four proof masses.

According to another aspect of the present application, a method of operating a microelectromechanical systems (MEMS) gyroscope comprising four proof masses disposed in respective quadrants of a plane is provided. The method may comprise causing the first proof mass and the third proof mass to resonate in-phase with respect to each other by constraining motion of the first proof mass and the third proof mass with a first outer coupler; causing the first proof mass and the second proof mass to resonate out-of-phase with respect to each other by constraining motion of the first proof mass and the second proof mass with an inner coupler; and detecting angular rate of at least one of the four proof masses by sensing motion of the at least one of the four proof masses along a direction perpendicular to the plane.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
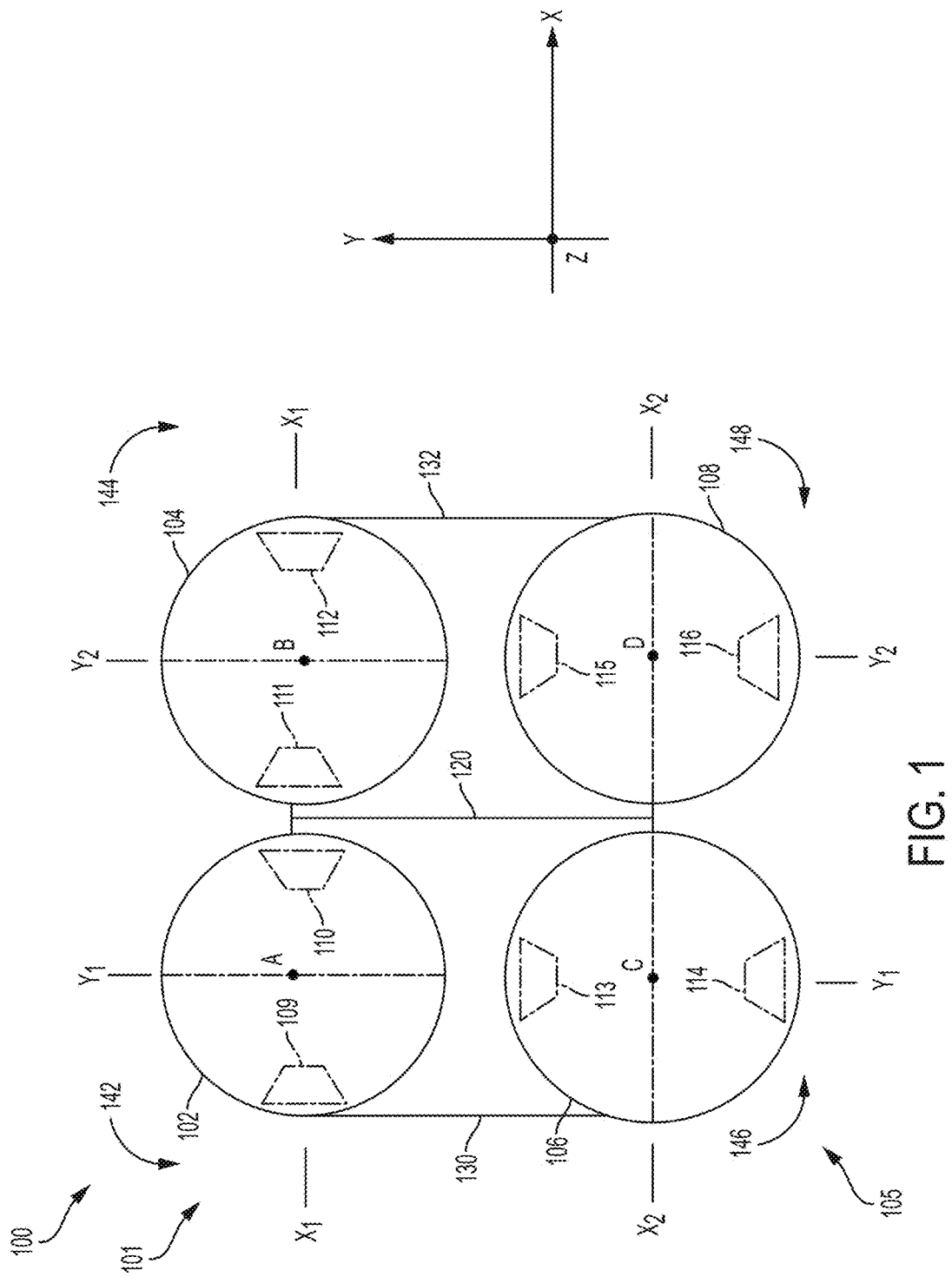
FIG. 1 is a schematic diagram illustrating a microelectromechanical systems (MEMS) gyroscope comprising four proof masses disposed in respective quadrants and having a plurality of outer couplers, according to some non-limiting embodiments.

Aspects of the present application provide gyroscopes which have four proof masses which are coupled together at inner edges, with two of the proof masses being additionally coupled together at their outer edges and the other two proof masses also being additionally coupled together at their outer edges. The inner edge and outer edge couplings may all be parallel to each other. In some embodiments, the outer edge couplings have a combined mass which balances the mass of the inner edge coupling.

Two-axis MEMS gyroscopes having four proof masses disposed in respective quadrants of a plane will be referred to herein as "quad proof mass gyroscopes," "quad mass gyroscopes," or simply "quad gyroscopes," with the term "quad" being short for "quadruple." They use a pair of proof masses to sense angular rates about a first axis, and another pair of proof masses to sense angular rates about a second axis different from the first axis and perpendicular to the first axis in at least some embodiments. The four proof masses comprise drive electrodes which cause the proof masses to oscillate about a third axis different from the first axis and the second axis in response to application of a control signal. If the quad gyroscope experiences an angular rate about the first and/or the second axes while the proof masses are oscillating, the proof mass may tilt in response to Coriolis accelerations. By sensing the amount of tilt with one or more sense capacitors, the angular rate experienced by the quad gyroscope may be inferred.

Compared to gyroscopes having one proof mass for detecting angular rates about a first axis and one proof mass for detecting angular rates about a second axis, quad proof mass gyroscopes may be less sensitive to vibrations occurring about the third axis, i.e., the oscillation axis of the proof masses. Accordingly, by configuring a pair of proof masses, for each detection axis, to oscillate in opposite phases with respect to one another, spurious common modes, including such vibrations about the oscillation axis, may be rejected.

A quad gyroscope may comprise an inner coupler, disposed in a region enclosed by the four proof masses, and configured to couple the four proof masses to one another. Such a coupler, referred to herein as "inner coupler", may force the proof masses to oscillate according to a common oscillation mode. Applicant has appreciated that two-axis microelectromechanical systems (MEMS) gyroscopes having four proof masses disposed in respective quadrants of a plane and solely being coupled at inner edges may exhibit multiple undesirable behaviors. One undesirable behavior is a mass imbalance. Coupling the four proof masses together only at their inner edges creates an added mass positioned centrally within the arrangement of four proof masses. The resulting mass imbalance may cause the gyroscope to be undesirably sensitive to linear accelerations, which may degrade the MEMS gyroscope's ability to sense angular rates. Due to such a mass imbalance, conventional two-axis MEMS gyroscopes having four proof masses disposed in respective quadrants of a plane and solely coupled at inner edges may exhibit a net momentum, which may cause the anchors connecting the proof masses to a substrate to bend. Such bending of the anchors may cause the proof masses to rock off-plane, thus further degrading the MEMS gyroscope's ability to sense angular rates. Coupling the proof masses together only at inner edges may additionally lead to an imbalance in the elastic constant of the gyroscope, which may cause the motion of the proof masses to be skewed. Such skewed motions may further degrade the MEMS gyroscope's ability to sense angular rates.

According to one aspect of the present application, a two-axis quad proof mass gyroscope having an inner coupler and a plurality of outer couplers is provided. The outer couplers and the inner coupler may be substantially parallel to one another. Such outer couplers may be configured to counteract the mass imbalance caused by the inner coupler, thus making the quad gyroscope less sensitive to linear accelerations and less susceptible to experience bending of the anchors. According to another aspect of the present application, the outer couplers may be configured to balance the elastic constant of the quad gyroscope, thus making the motion of the proof masses less skewed.

The aspects and embodiments described above, as well as additional aspects and embodiments, are described further below. These aspects and/or embodiments may be used individually, all together, or in any combination of two or more, as the application is not limited in this respect.

FIG. 1 is a schematic diagram illustrating a MEMS gyroscope comprising four proof masses disposed in respective quadrants and having a plurality of outer couplers, according to some non-limiting embodiments. Quad gyroscope 100 may be configured to sense angular rates about the x-axis and the y-axis. Dual gyroscope 100 may comprise four proof masses 102, 104, 106 and 108, disposed in respective quadrants of the xy-plane. Proof masses 102 and 104 may form a gyroscope 101 for detecting angular rates about the x-axis and proof masses 106 and 108 may form a gyroscope 105 for detecting angular rates about the y-axis. Proof mass 102 may comprise sense capacitors 109 and 110, proof mass 104 may comprise sense capacitors 111 and 112, proof mass 106 may comprise sense capacitors 113 and 114, and proof mass 108 may comprise sense capacitors 115 and 116. In the illustrated embodiment, quad gyroscope 100 further comprises inner coupler 120, and outer couplers 130 and 132.

In some embodiments, proof masses 102, 104, 106 and 108 may be shaped as discs. However, the application is not limited in this respect and the proof masses may have any other suitable shape. Proof masses 102 and 104 may be driven to oscillate about axes that are parallel to the z-axis and pass through points "A" and "B" respectively. Points A and B may positioned at the center of proof masses 102 and 104 in some embodiments. As illustrated by arrows 142 and 144, proof masses 102 and 104 may be driven to oscillate with opposite phases. For example, when proof mass 102 oscillates counterclockwise, proof mass 104 may oscillate clockwise, and when proof mass 102 oscillates clockwise, proof mass 104 may oscillate counterclockwise.

Proof masses 106 and 108 may be driven to oscillate about axes that are parallel to the z-axis and pass through points "C" and "D" respectively. Points C and D may positioned at the center of proof masses 106 and 108 in some embodiments. As illustrated by arrows 146 and 148, proof masses 106 and 108 may be driven to oscillate with opposite phases. For example, when proof mass 106 oscillates counterclockwise, proof mass 108 may oscillate clockwise, and when proof mass 106 oscillates clockwise, proof mass 108 may oscillate counterclockwise.

Proof masses 102 and 104 may be both centered along the $y_1$-axis, parallel to the x-axis, and proof masses 106 and 108 may be both centered along the $x_2$-axis, parallel to the x-axis. However the application is not limited in this respect, and the center of respective proof masses may be slightly offset, along the y-axis, with respect to one another. For example, the center of respective proof masses may be offset, along the y-axis, by an amount that is less than 10 μm in some embodiments, less than 7.5 μm in some embodiments, less than 5 μm in some embodiments, less than 2.5 μm in some embodiments, less than 1 μm in some embodiments, or less than any other suitable value.

Proof masses 102 and 106 may be both centered along the $y_1$-axis, parallel to the y-axis, and proof masses 104 and 108 may be both centered along the $y_2$-axis, parallel to the y-axis. However the application is not limited in this respect, and the center of respective proof masses may be slightly offset, along the x-axis, with respect to one another. For example, the center of respective proof masses may be offset, along the x-axis, by an amount that is less than 10 μm in some embodiments, less than 7.5 μm in some embodiments, less than 5 μm in some embodiments, less than 2.5 μm in some embodiments, less than 1 μm in some embodiments, or less than any other suitable value.

Inner coupler 120, which may pass between proof masses 102 and 104, and between proof masses 106 and 108, may couple the four proof masses to one another. As a result, the four proof masses may be forced to oscillate according to a common oscillation mode. Outer coupler 130 may couple proof mass 102 to proof mass 106, and outer coupler 132 may couple proof mass 104 to proof mass 108. In some embodiments, outer coupler 130 and outer coupler 132 may have approximately (e.g., within a 10% tolerance) equal masses. In some embodiments, each one of outer coupler 130 and outer coupler 132 may have a mass that is approximately (e.g., within a 10% tolerance) equal to half the mass of inner coupler 120. Accordingly, inner coupler 120 may have a width that is approximately twice the width of outer couplers 130 and 132.

Outer coupler 130 may be rigid in some embodiments, and as such, may force proof masses 102 and 106 to oscillate in phase with respect to one another, as illustrated by arrows 142 and 146. For example, when proof mass 102 oscillates counterclockwise, proof mass 106 may also oscillate counterclockwise, and when proof mass 102 oscillates clockwise, proof mass 106 may also oscillate clockwise. Similarly, outer coupler 132 may be rigid in some embodiments, and as such, may force proof masses 104 and 108 to oscillate in phase with respect to one another, as illustrated by arrows 144 and 148. For example, when proof mass 104 oscillates counterclockwise, proof mass 108 may also oscillate counterclockwise, and when proof mass 104 oscillates clockwise, proof mass 108 may also oscillate clockwise.

The MEMS gyroscope illustrated in FIG. 1 may be used to detect roll and/or pitch angular rates. For example, rolling may give rise to angular rates occurring about the x-axis and pitching may give rise to angular rates occurring about the y-axis, though the opposite scenario is also possible.

Figure 2:
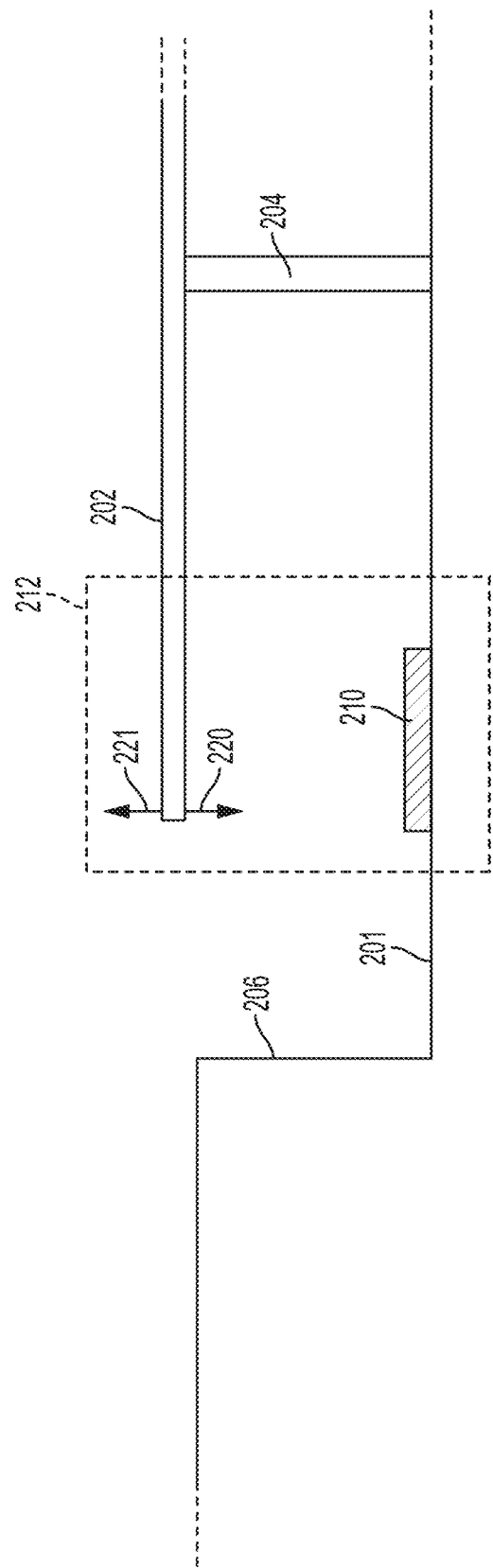
FIG. 2 is a schematic diagram illustrating a sense capacitor for detecting angular rates, according to some non-limiting embodiments.

In some embodiments, the proof masses may be formed with a conductive material, such as polysilicon. The proof masses may each form a pair of sense capacitors with respective sense electrodes disposed on a surface of the substrate of quad gyroscope 100. FIG. 2 illustrates an exemplary sense capacitor, according to some non-limiting embodiments. Proof mass 202, which may serve as proof mass 102, 104, 106 or 108, may be coupled to the substrate 201 through an anchor 204. Anchor 204 may be connected to the center of proof mass 202 in some embodiments. Proof mass 202 may form a sense capacitor 212 with sense electrode 210, disposed on a surface of substrate 201. Sense capacitor 212 may serve as sense capacitor 109, 110, 111, 112, 113, 114, 115 or 116. The capacitance of sense capacitor 212 may vary as the distance between the proof mass 202 and the substrate 201 varies. For example proof mass 202 may tilt according to arrow 221, thus causing the capacitance associated with sense capacitor 212 to decrease. On the other hand, proof mass 202 may tilt according to arrow 220, thus causing the capacitance associated with sense capacitor 212 to increase. By sensing variations in the capacitance, for example with sense circuitry coupled to sense electrode 210, the tilt experienced by proof mass 202 may be detected.

Referring back to FIG. 1, proof masses 102 and 104 may collectively be configured to sense angular rates about the x-axis. Accordingly, when quad gyroscope 100 experiences an angular rate about the x-axis, proof mass 102 may rotate about the $y_1$-axis and proof mass 104 may rotate about the $y_2$-axis. Such rotations may be caused by Coriolis forces arising from the combination of oscillation of the proof mass about the z-axis and angular rates about the x-axis. As the proof masses rotate about respective axes, sense capacitors 109, 110, 111 and 112 may exhibit variations in the respective capacitance. In response to Coriolis forces, sense capacitors 109 and 112 may operate in phase with one another, and sense capacitors 110 and 111 may operate in phase with one another. Variations in the capacitance of sense capacitors 109 and 112 may generate a first sense signal, and variations in the capacitance of sense capacitors 110 and 111 may generate a second sense signal. The first and the second sense signals may collectively form a differential sense signal.

Proof masses 106 and 108 may collectively be configured to sense angular rates about the y-axis. Accordingly, when quad gyroscope 100 experiences an angular rate about the y-axis, proof masses 106 and 108 may rotate about the $x_2$-axis. Such rotations may be caused by Coriolis forces arising from the combination of oscillation of the proof mass about the z-axis and angular rates about the y-axis. As the proof masses rotate, sense capacitors 113, 114, 115 and 116 may exhibit variations in the respective capacitance. In response to Coriolis forces, sense capacitors 113 and 116 may operate in phase with one another, and sense capacitors 114 and 115 may operate in phase with one another. Variations in the capacitance of sense capacitors 113 and 116 may generate a third sense signal, and variations in the capacitance of sense capacitors 110 and 111 may generate a fourth sense signal. The third and the fourth sense signals may collectively form a differential sense signal.

In some embodiments, the mass of the outer couplers 130 and 132 may be selected to ensure that the center of mass of each of the proof masses is substantially positioned (e.g., having a distance that is less than 5 µm) in correspondence with a respective oscillation axis (the axes passing through points A, B, C and D). In this way, the sensitivity of the proof masses with respect to linear accelerations may be mitigated. In some embodiments, the shape of outer couplers may be configured to prevent skew in the motion of the proof masses. For example, the shape of the outer couplers may be configured to provide an elastic constant that matches the elastic constant of the inner coupler 120.

In some embodiments, the outer couplers 130 and 132 may be shaped as beams, rods, ties, or tethers and may have any suitable dimensions. The ends of the outer couplers may connect to corresponding proof masses. In some embodiments, either ends of an outer coupler may be coupled to the midpoint of a corresponding proof mass. The midpoint of a proof mass may refer to the point where the periphery of the proof mass intersects the axis of the proof mass parallel to the x-axis (e.g., the $x_1$-axis or the $x_2$-axis). In some embodiments, outer couplers 130 and 132 may be substantially parallel to one another (e.g., having an angle that is less than 5° between them). In some embodiments, outer couplers 130 and 132 may be substantially parallel to inner coupler 120 (e.g., having an angle that is less than 5° with respect to each other). In some embodiments, outer couplers 130 and 132 may be symmetrically disposed with respect to inner coupler 120. In some embodiments, such as that illustrated, quad gyroscope 100 lacks outer couplers coupling proof masses 102 and 104 to one another, and lacks outer couplers coupling proof masses 106 and 108 to one another. Thus, in some embodiments the proof masses 102, 104, 106, and 108 are interconnected in the xy-plane only by couplers which are parallel to each other (e.g., parallel to the y-axis in the illustration), with one or more couplers being disposed internal to the arrangement of four proof masses and one or more couplers being disposed external to the arrangement of four proof masses (e.g., at a periphery of the arrangement of four proof masses).

Figure 3:
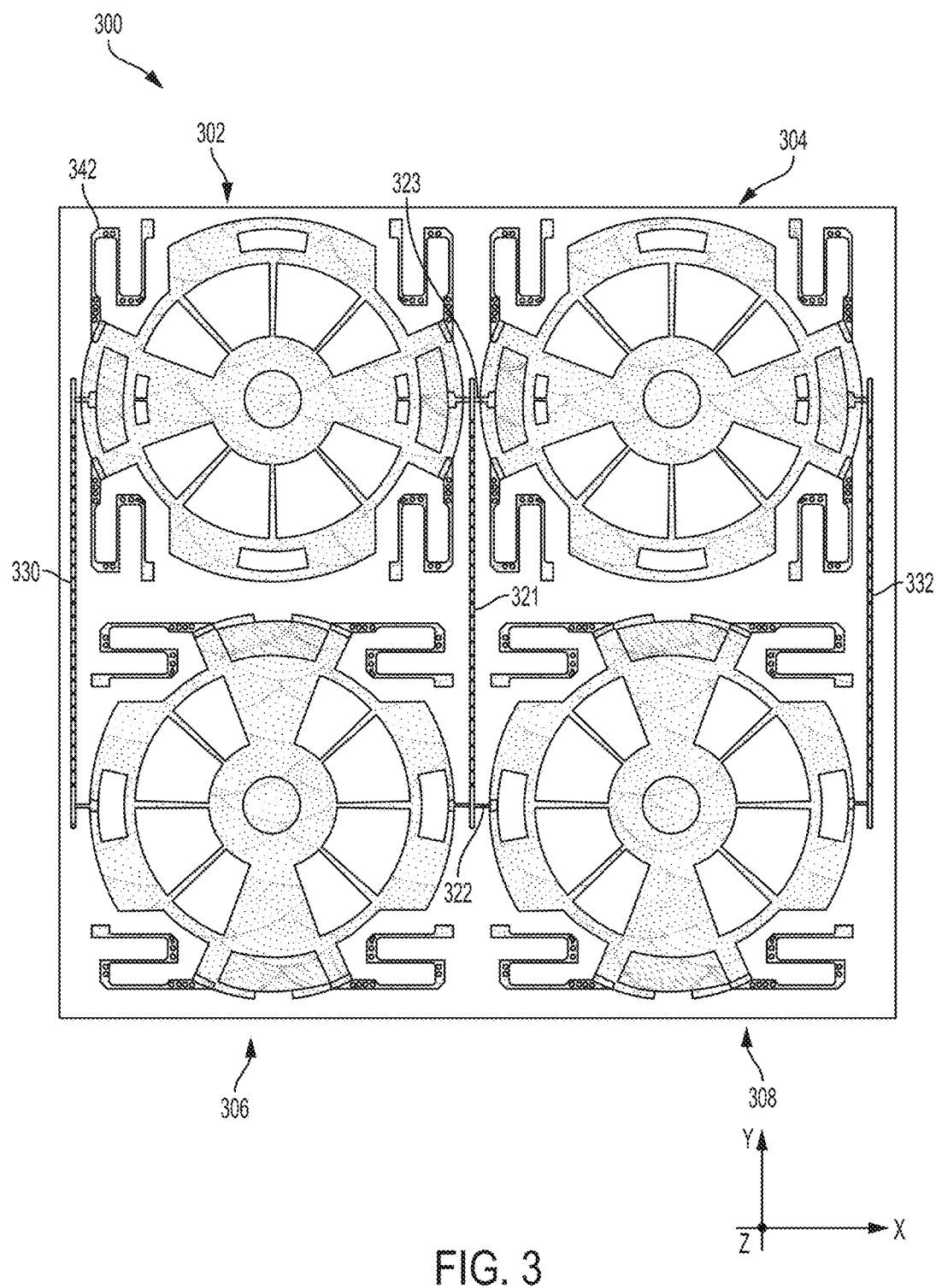
FIG. 3 is a schematic diagram illustrating another MEMS gyroscope comprising four proof masses disposed in respective quadrants and having a plurality of outer couplers, according to some non-limiting embodiments.

The proof masses may be coupled to the substrate through respective anchors, such as anchor 204 of FIG. 2. Alternatively, or additionally, the proof masses may be coupled to the substrate through respective springs. Each spring may have one end coupled to a proof mass and a second end coupled to a wall of the substrate, such as wall 206 of FIG. 2. FIG. 3 is a schematic diagram illustrating a quad gyroscope having proof masses coupled to the substrate through springs. Proof masses 302, 304, 306 and 308 may each be connected to the substrate through a plurality of springs 342. Quad gyroscope 300 may comprise outer couplers 330 and 332, and beams 321, 322 and 323. Quad gyroscope 300 may operate in the manner described in connection with quad gyroscope 100.

The springs 342 may be configured to allow for rotations of proof masses 302 and 304 about the y-axis, and to allow for rotations of proof masses 306 and 308 about the x-axis. In some embodiments, the springs 342 may have serpentine shapes.

Beam 323 may couple proof masses 302 and 304 to one another, and beams 322 may couple proof masses 306 and 308 to one another. Beam 321 may couple beams 322 and 323 to one another. Beams 321, 322 and 323 may collectively form an inner coupler of the type described in connection with inner beam 120. However an inner coupler may comprise any other suitable number of beams.

Outer beams 330 and 331 may be configured to counteract mass imbalance existing in quad gyroscope 300, thus mitigating the sensitivity of the quad gyroscope with respect to linear accelerations. Alternatively, or additionally, the outer couplers 330 and 331 may be configured to prevent rotations of the proof masses about the x-axis and the y-axis in the absence of angular rates. While respective proof masses are coupled to one another through a single outer coupler, the application is not limited in this respect and two proof masses may be coupled through a plurality of outer couplers. The plurality of outer couplers may be substantially parallel to one another.

Figure 4:
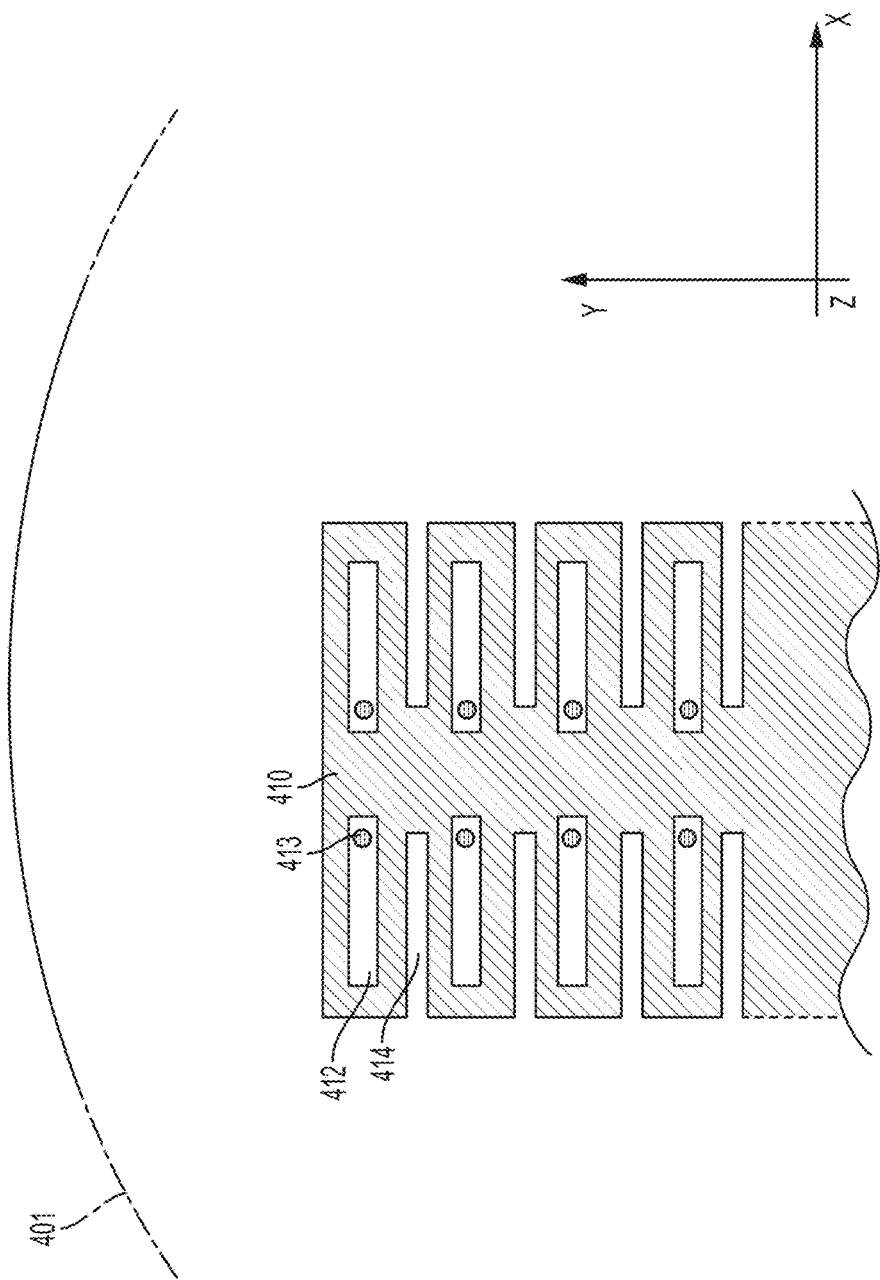
FIG. 4 is a schematic diagram illustrating a plurality of drive capacitors, according to some non-limiting embodiments.

As described in connection with quad gyroscope 100, the proof masses may be driven to oscillate about the z-axis. Such oscillations may be obtained, for example, by driving one or more drive capacitors with a control signal. FIG. 4 illustrates an exemplary proof mass 401 comprising an opening 410, a plurality of drive electrodes 414, and a plurality of fixed electrodes 412. Proof mass 401 may serve as any of the proof masses described in connection with FIGS. 1 and 3.

Opening 410 may be obtained by etching a portion of proof mass 401. Fixed electrodes 412 may be disposed within opening 410, and may be coupled to the substrate through respective anchors 413. Drive electrodes 414 may be connected to the proof mass and may be radially oriented in some embodiments. The fixed electrodes and the drive electrodes may form a plurality of drive capacitors. Such drive capacitors may be driven, for example using a sinusoidal signal, to cause the proof mass 401 to oscillate about the z-axis.

The embodiments described in connection with FIGS. 1-4 may be used to sense roll and/or pitch angular rates. In such circumstances, the proof masses may be driven to resonate about the z-axis, and angular rates about the x-axis and/or the y-axis may be sensed. However, MEMS gyroscopes of the type described herein may be alternative used to sense yaw angular rates, occurring for example about the z-axis. In one embodiment, a MEMS gyroscope, such as MEMS gyroscope 100 or 300, may be driven such that a pair of proof masses, such as proof masses 102 and 104, resonate about the y-axis. The proof masses may be driven using sense capacitors 109, 110, 111 and 112, which in this circumstance, may be configured to operate as drive capacitors. Angular rates about the z-axis experienced by the resonating proof masses may be sensed using the drive electrodes described in connection with FIG. 4, which in this circumstance, may be configured to operate as sense electrodes.

In some embodiments, a MEMS gyroscope of the type described herein may be configured to sense yaw and roll angular rates. For example, a pair of proof masses, such as proof masses 102 and 104, may sense yaw angular rates by resonating about the y-axis and by sensing angular rates about the z-axis, and another pair of proof masses, such as proof masses 106 and 108, may sense roll angular rates by resonating about the z-axis and by sensing angular rates about the x-axis.

In some embodiments, a MEMS gyroscope of the type described herein may be configured to sense yaw and pitch angular rates. For example, a pair of proof masses, such as proof masses 106 and 108, may sense yaw angular rates by resonating about the y-axis and by sensing angular rates about the z-axis, and another pair of proof masses, such as proof masses 102 and 104, may sense pitch angular rates by resonating about the z-axis and by sensing angular rates about the y-axis.

As described with respect to FIG. 2, sense circuitry may be coupled to the sense capacitors and may be configured to sense variations in the capacitances. In some embodiments, the sense circuitry may be disposed on the same substrate on which a quad gyroscope of the type described herein is disposed. In other embodiments, the sense circuitry and the quad gyroscope may be disposed on separate substrates, which may be bonded to one another and/or packaged within a common housing.

Figure 5:
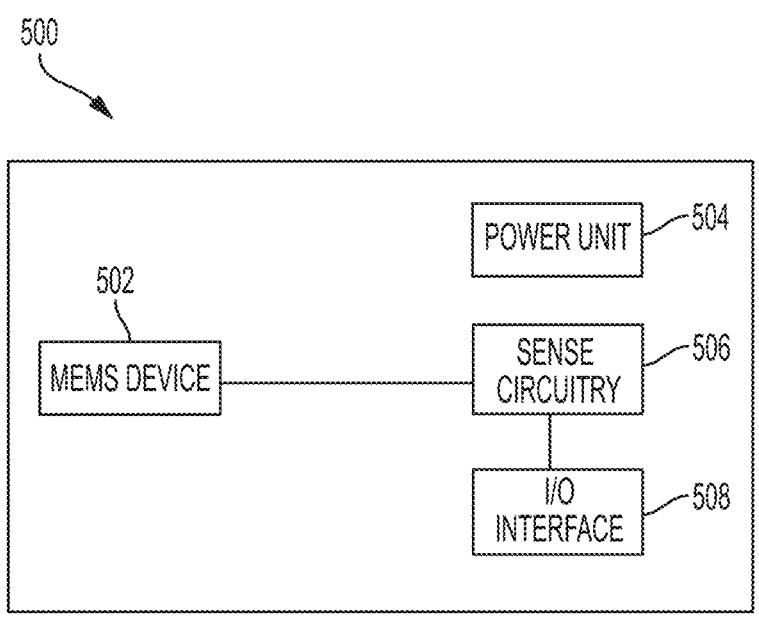
FIG. 5 is a block diagram illustrating a system comprising a two-axis MEMS gyroscope of the types described herein, according to some non-limiting embodiments.

FIG. 5 is a block diagram illustrating a system 500 comprising a MEMS device 502, a power unit 504, sense circuitry 506 and input/output (I/O) interface 508. MEMS device 502 may comprise quad gyroscope 100 and/or 300. The quad gyroscope may be configured to sense roll and pitch angular rates. MEMS device 502 may further comprise a z-axis gyroscope, which may be configured to sense yaw angular rates.

System 500 may periodically transmit, via wired connections or wirelessly, data representing sensed angular rates to an external monitoring system, such as a computer, a smartphone, a tablet, a smartwatch, smartglasses, or any other suitable receiving device. I/O interface 508 may be configured to transmit and/or receive data via Wi-Fi, Bluetooth, Bluetooth Low Energy (BLE), Zigbee, Thread, ANT, ANT+, IEEE 802.15.4, IEEE 802.11.ah, or any other suitable wireless communication protocol. Alternatively, or additionally, I/O interface 508 may be configured to transmit and/or receive data using proprietary connectivity protocols. I/O interface 508 may comprise one or more antennas, such as a microstrip antenna. In some embodiments, I/O interface 508 may be connected to a cable, and may be configured to transmit and/or receive signals through the cable.

System 500 may be powered using power unit 504. Power unit 504 may be configured to power sense circuitry 506, I/O interface 508, MEMS device 502, or any suitable combination thereof. In some embodiments, power unit 504 may comprise one or more batteries. System 500 may, in at least some embodiments, consume sufficiently little power to allow for its operation for extended periods based solely on battery power. The battery or batteries may be rechargeable in some embodiments. Power unit 504 may comprise one or more lithium-ion batteries, lithium polymer (LiPo) batteries, super-capacitor-based batteries, alkaline batteries, aluminum-ion batteries, mercury batteries, dry-cell batteries, zinc-carbon batteries, nickel-cadmium batteries, graphene batteries or any other suitable type of battery. In some embodiments, power unit 504 may comprise circuitry to convert AC power to DC power. For example, power unit 504 may receive AC power from a power source external to system 500, such as via I/O interface 508, and may provide DC power to some or all the components of system 500. In such instances, power unit 504 may comprise a rectifier, a voltage regulator, a DC-DC converter, or any other suitable apparatus for power conversion.

Power unit 504 may comprise energy harvesting components and/or energy storage components, in some embodiments. Energy may be harvested from the surrounding environment and stored for powering the system 500 when needed, which may include periodic, random, or continuous powering. The type of energy harvesting components implemented may be selected based on the anticipated environment of the system 500, for example based on the expected magnitude and frequency of motion the system 500 is likely to experience, the amount of stress the system is likely to experience, the amount of light exposure the system is likely to experience, and/or the temperature(s) to which the system is likely to be exposed, among other possible considerations. Examples of suitable energy harvesting technologies include thermoelectric energy harvesting, magnetic vibrational harvesting, electrical overstress harvesting, photovoltaic harvesting, radio frequency harvesting, and kinetic energy harvesting. The energy storage components may comprise supercapacitors in some embodiments.

System 500 may be deployed in various settings to detect angular rates, including sports, healthcare, military, and industrial applications, among others. Some non-limiting examples are now described. A system 500 may be a wearable sensor deployed in monitoring sports-related physical activity and performance, patient health, military personnel activity, or other applications of interest of a user. A system 500 may be disposed in a smartphone, and may be configured to sense roll and pitch angular rates.

Figure 6:
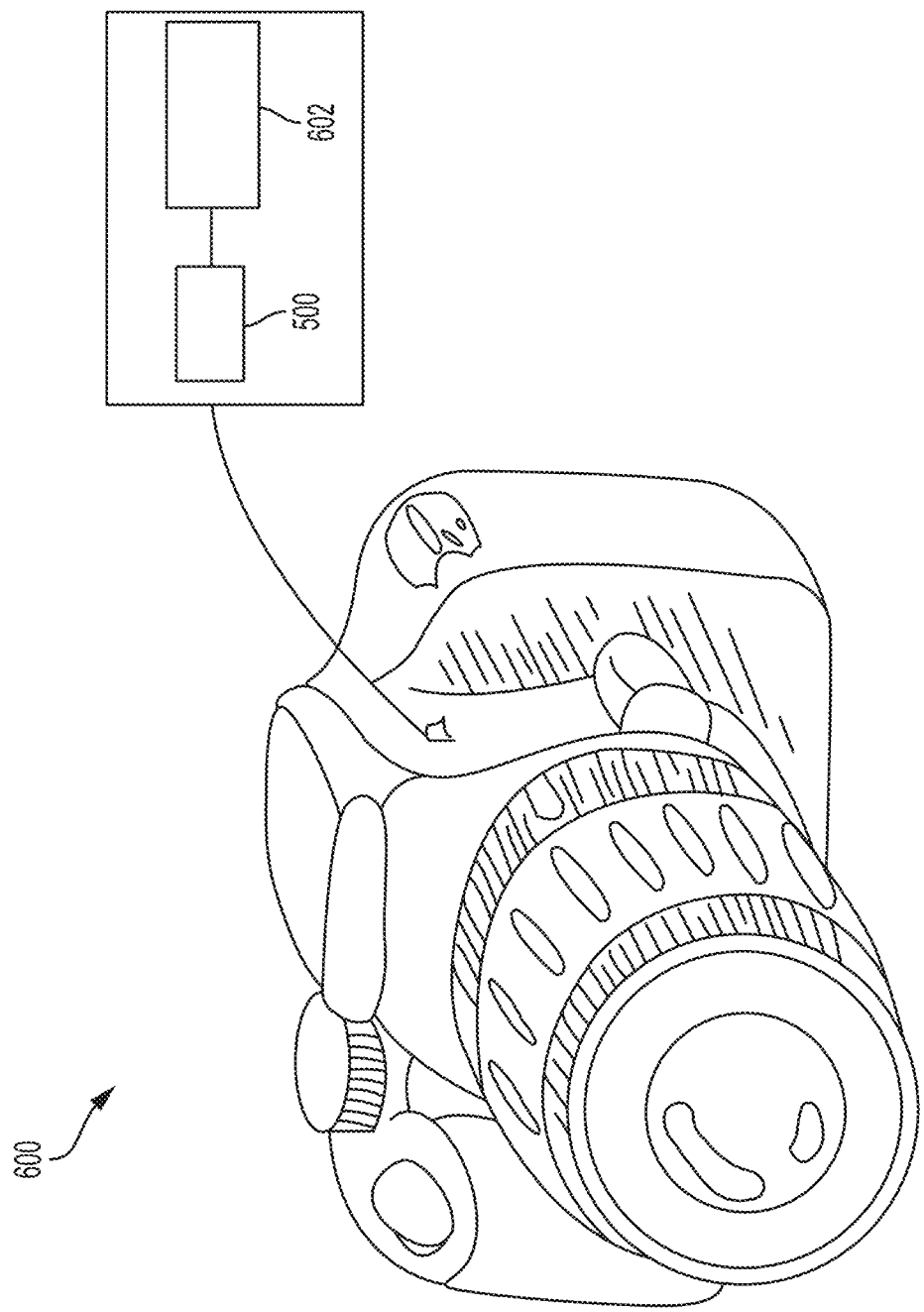
FIG. 6 illustrates a photographic camera comprising the system of FIG. 5, according to some non-limiting embodiments.

One such setting is in photographic applications. FIG. 6 illustrates schematically a photographic camera 600 comprising a system 500. System 500 may be configured to sense angular rates about one, two or three axes. System 500 may be disposed in any suitable location of the photographic camera 600. System 500 may provide sensed angular rates to a stabilization unit 602. The stabilization unit 602 may be configured to compensate for angular motion. For example, stabilization unit 602 may comprise a motor, such as DC motor, configured to mitigate angular motion. Alternatively, or additionally, stabilization unit 602 may comprise circuitry configured to digitally compensate for angular motion based on the information provided by system 500.

Figure 7:
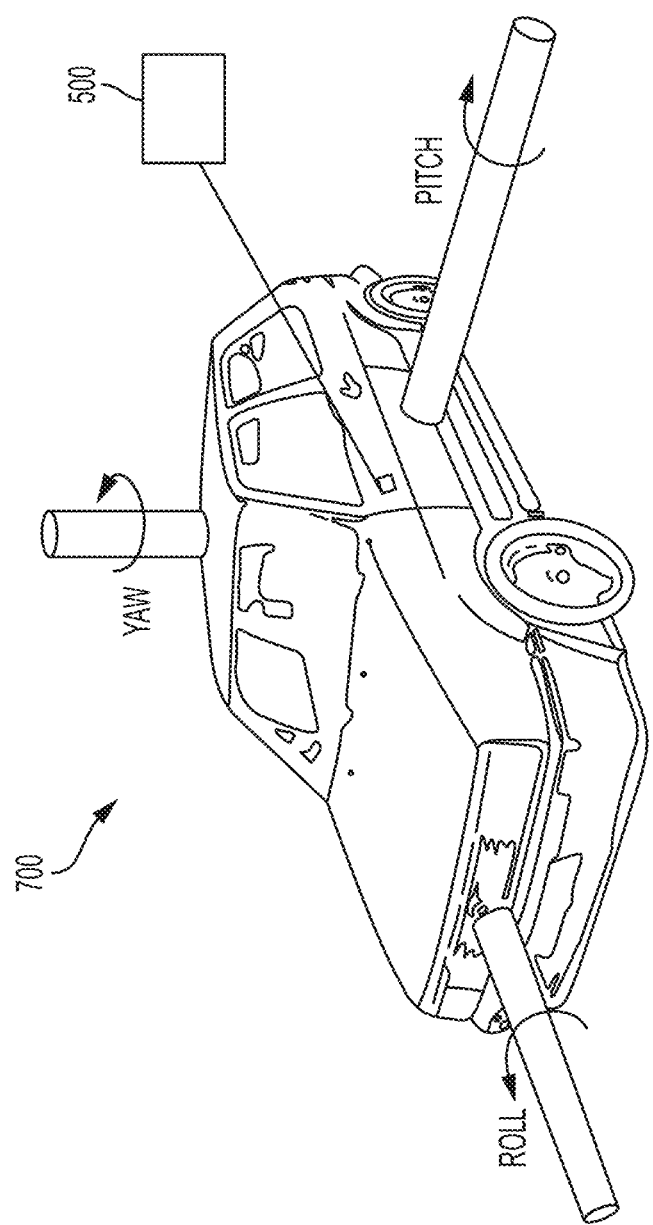
FIG. 7 illustrates a vehicle comprising the system of FIG. 5, according to some non-limiting embodiments.

Another such setting is in automobiles, or other vehicles, such as boats or aircrafts. FIG. 7 illustrates schematically a car 700 comprising a system 500. System 500 may be disposed in any suitable location of car 700. System 500 may be configured to sense roll, pitch and/or yaw angular rates. System 500 may be configured to provide, using I/O interface 508, sensed angular rates to a computer system disposed in car 700 and/or to a computer system disposed on a base station outside car 700.

Figure 8:
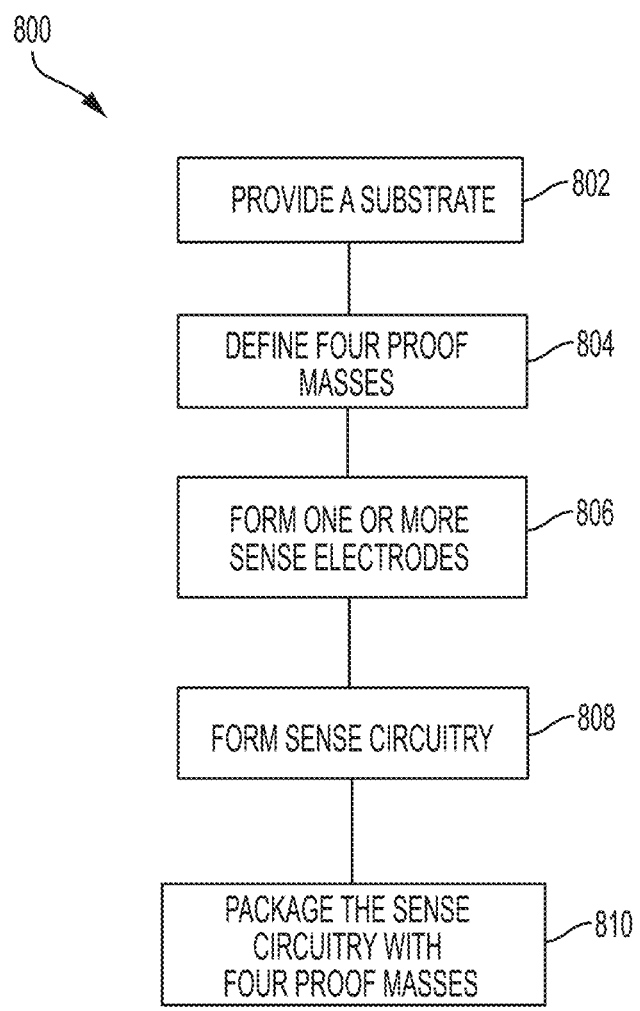
FIG. 8 is a flowchart illustrating a method of fabricating a MEMS gyroscope of the types described herein, according to some non-limiting embodiments.

The quad gyroscopes described herein may be fabricated using MEMS fabrication techniques. FIG. 8 is a flowchart illustrating a method for fabricating a quad gyroscope of the type described herein. Method 800 may begin at act 802, in which a substrate, such as a silicon substrate, is provided. At act 804, four proof masses disposed in respective quadrants of a sense plane may be defined in the substrate. The proof masses may be defined using conventional photolithographic techniques. Each of the proof masses may be configured to rotate within the plane. Each of the four proof masses may be formed with a plurality of radially oriented drive electrodes, a first outer coupler coupling first and second proof masses of the four proof masses, a second outer coupler coupling third and fourth proof masses of the four proof masses, and an inner coupler passing between the first and third proof masses and between the second and fourth proof masses and coupling the four proof masses with one another.

At act 806, one or more sense electrodes may be formed on a surface of the substrate. For example, the sense electrodes may be formed by depositing a layer of metal, such as aluminum or copper, on a surface of the substrate. Subsequently, the metal layer may be patterned using conventional photolithographic techniques.

At act 808, sense circuitry may be formed on a separate substrate.

At act 810, the sense circuitry may be packaged with the substrate comprising the four proof masses, for example using wire bonding or flip-chip bonding packaging techniques. The sense circuitry may be packaged to be electrically coupled to the sense electrodes.

Aspects of the present application may provide one or more benefits, some of which have been previously described. Now described are some non-limiting examples of such benefits. It should be appreciated that not all aspects and embodiments necessarily provide all of the benefits now described. Further, it should be appreciated that aspects of the present application may provide additional benefits to those now described.

Aspects of the present application provide quad gyroscopes that, compared to conventional quad gyroscopes, are less sensitive to linear accelerations. Linear accelerations may be inadvertently detected by the sense circuitry coupled to the quad gyroscope, and may cause inaccuracies in the sensed angular rates. According to one aspect of the present application, outer couplers may be configured to balance the mass of the quad gyroscope, thus significantly reduce the susceptibility to linear accelerations.

Aspects of the present application provide quad gyroscopes that, compared to conventional quad gyroscopes, exhibit a lower degree of anchor bending. Bending of the anchors may be caused by imbalances in the mass of the four proof masses, and may cause the proof masses to rock off-plane, thus degrading the MEMS gyroscope's ability to sense angular rates. According to one aspect of the present application, outer couplers may be configured to balance the mass of the quad gyroscope, thus significantly reducing such bending of the anchors.

Aspects of the present application provide quad gyroscopes that, compared to conventional quad gyroscopes, exhibit a lower degree of motion skew. Imbalances in the elastic constant of the proof masses may cause the motion of the proof masses to be skewed. According to one aspect of the present application, outer couplers may be configured to balance the elastic constants across the four proof masses, thus reducing motion skew.

The terms "approximately", "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A microelectromechanical systems (MEMS) gyroscope comprising:
    four proof masses coupled to a substrate, the four proof masses being disposed in respective quadrants of a plane and each configured to rotate relative to the substrate, a first proof mass of the four proof masses and a second proof mass of the four proof masses being configured to rotate in-phase;
    at least one electrode configured to cause rotation of the first proof mass relative to the substrate;
    a first outer coupler coupling the first and second proof masses of the four proof masses;
    a second outer coupler coupling third and fourth proof masses of the four proof masses; and
    a beam-shaped coupler intersecting a first imaginary axis connecting respective centers of the first and third proof masses to each other and further intersecting a second imaginary axis connecting respective centers of the second and fourth proof masses to each other, the beam-shaped coupler coupling the four proof masses with one another.

2. The MEMS gyroscope of claim 1, wherein the third and fourth proof masses are configured to resonate in-phase.

3. The MEMS gyroscope of claim 2, wherein the first and third proof masses are configured to resonate out-of-phase.

4. The MEMS gyroscope of claim 1, wherein a third imaginary axis that connects the respective centers of the first proof mass and the second proof mass to each other is substantially perpendicular to the first imaginary axis.

5. The MEMS gyroscope of claim 1, wherein the first outer coupler and the second outer coupler are substantially parallel to one another.

6. The MEMS gyroscope of claim 1, further comprising a sense electrode disposed on the substrate and forming a sense capacitor with a portion of the first proof mass.

7. The MEMS gyroscope of claim 1, wherein the first outer coupler and the second outer coupler have approximately equal masses.

8. The MEMS gyroscope of claim 1, wherein each of the four proof masses is configured to rotate within the plane.

9. The MEMS gyroscope of claim 1, wherein the first and the second outer couplers are symmetrically disposed with respect to the beam-shaped coupler.

10. The system of claim 1, wherein the first proof mass is configured to, when driven to oscillate in the plane, tilt outside the plane in response to rotation of the MEMS gyroscope.

11. The system of claim 1, wherein the first proof mass is configured to, when driven to oscillate in the plane, tilt about a first axis lying on the plane in response to rotation of the MEMS gyroscope about a second axis lying on the plane, the second axis being perpendicular to the first axis.

12. The system of claim 10, wherein each of the rotational axes of the four proof masses is perpendicular to the plane.

13. A system comprising:
    four proof masses coupled to a substrate, the four proof masses being disposed in respective quadrants of a plane and each configured to rotate relative to the substrate within the plane about respective rotational axes, a first proof mass of the four proof masses and a second proof mass of the four proof masses being configured to resonate in-phase;
    at least one electrode configured to cause rotation of the first proof mass relative to the substrate;
    a first outer coupler coupling the first and second proof masses of the four proof masses;
    a second outer coupler coupling third and fourth proof masses of the four proof masses;
    an inner coupler passing between the first and third proof masses and between the second and fourth proof masses and coupling the four proof masses with one another, the inner coupler comprising a first beam connecting the first proof mass to the third proof mass, a second beam connecting the second proof mass to the fourth proof mass, and a third beam connecting the first beam to the second beam, the third beam intersecting a first imaginary axis connecting the respective rotational axes of the first and third proof masses to each other and the third beam further intersecting a second imaginary axis connecting the respective rotational axes of the second and fourth proof masses to each other;
    a sense electrode disposed on the substrate and forming a sense capacitor with a portion of the first proof mass; and
    sense circuitry coupled to the sense capacitor and configured to digitize angular rate data for at least one of the four proof masses.

14. The system of claim 13, further comprising an I/O interface coupled to the sense circuitry and configured to transmit the digitized angular rate data to a monitoring station disposed external to the system.

15. The system of claim 13, further comprising a display coupled to the sense circuitry and configured to display an image corresponding to the digitized angular rate data.

16. The system of claim 13, wherein the third beam, the first outer coupler and the second outer coupler are substantially parallel to each other.

17. The system of claim 13, wherein the third and fourth proof masses are configured to resonate in-phase.

18. The system of claim 17, wherein the first and third proof masses are configured to resonate out-of-phase.

19. A device comprising the system of claim of 13 and a mechanical stabilizer coupled to the sense circuitry and configured to stabilize the device in response to the angular rate data.

* * * * *